US006963445B2

(12) United States Patent
Hoover et al.

(10) Patent No.: US 6,963,445 B2
(45) Date of Patent: Nov. 8, 2005

(54) LIGHT DIFFUSER FOR OPTICAL MICROSCOPES REPLACING CONDENSER WITH OPAL GLASS TO PRODUCE NEAR-KOEHLER ILLUMINATION

(76) Inventors: Rex A. Hoover, 5263 Stewart Rd., Sumerduck, VA (US) 22742; Robert G. Hoover, 5263 Stewart Rd., Sumerduck, VA (US) 22742

( * ) Notice: Subject to any disclaimer, the term of this patent is extended or adjusted under 35 U.S.C. 154(b) by 0 days.

(21) Appl. No.: 10/443,842

(22) Filed: May 23, 2003

(65) Prior Publication Data

US 2004/0156109 A1  Aug. 12, 2004

Related U.S. Application Data

(60) Provisional application No. 60/445,448, filed on Feb. 7, 2003.

(51) Int. Cl.[7] ............................................. G02B 21/06
(52) U.S. Cl. ..................... 359/385; 359/368; 359/599
(58) Field of Search ............................... 359/599, 368, 359/385–387, 370, 371

(56) References Cited

U.S. PATENT DOCUMENTS

| | | | |
|---|---|---|---|
| 2,471,879 A * | 5/1949 | Lowber et al. | 359/389 |
| 3,643,078 A * | 2/1972 | Lewis | 362/127 |
| 3,920,311 A | 11/1975 | Tsuda et al. | |
| 4,236,781 A | 12/1980 | Arimura | |
| 5,119,233 A * | 6/1992 | Hayashi | 359/390 |
| 5,734,498 A * | 3/1998 | Krasieva et al. | 359/387 |
| 5,818,637 A * | 10/1998 | Hoover et al. | 359/381 |
| 6,243,197 B1 * | 6/2001 | Schalz | 359/388 |
| 6,271,963 B1 | 8/2001 | Freifeld | |
| 6,469,779 B2 | 10/2002 | Baer et al. | |
| 2002/0001074 A1 * | 1/2002 | Baer et al. | 356/36 |

* cited by examiner

Primary Examiner—Drew A. Dunn
Assistant Examiner—Mark Consilvio
(74) Attorney, Agent, or Firm—C. C. Shroff; Papan Devnani, Esq.

(57) ABSTRACT

A light diffuser for use in illumination systems of optical microscopes which utilize a light source to illuminate a specimen staged on the microscope for observation. The light diffuser includes a light diffusing plate made of opal glass positioned closely adjacent the specimen. The light diffusing plate randomly breaks up light transmitted from a light source which passes therethrough into spatially isotopic light. The isotropic light illuminates the specimen for observation of a specimen image through the microscope with substantially reduced diffraction shadows which obscure the specimen. The light diffuser is utilized as part of an illumination lens system for microscopes and a method of use thereof which includes a plurality of lenses, an aperture diaphragm, and a field diaphragm which allow adjustment of the contrast and field of illumination of the image.

24 Claims, 6 Drawing Sheets

LIGHT DIFFUSER FOR OPTICAL MICROSCOPES REPLACING CONDENSER WITH OPAL GLASS TO PRODUCE NEAR-KOEHLER ILLUMINATION

RELATED APPLICATION

This application claims priority of my copending U.S. Provisional Patent Application No. 60/445,448 filed Feb. 7, 2003.

BACKGROUND OF THE INVENTION

1. Field of Invention

The present invention relates generally to the optical microscopes for viewing specimens, and more particularly to the illumination systems used to illuminate the specimens.

2. Description of Related Art

Optical microscopes are used to examine the microscopic structure of specimens in many diverse fields from metallurgy to biology and modern medicine. These diverse applications have differing needs to produce images observable through the microscope which show the features of interest in the specimen to be observed. The typical microscope includes a stand which supports a stage for holding a specimen placed on a glass slide, a light source for producing a light beam to illuminate the specimen for viewing, a collector for directing the light beam produced by the light source, a condenser which includes one or more lenses to concentrate the light from the light source through the collector to illuminate the specimen, an objective for receiving light from the specimen in the form of an image focusing an image of the specimen, the objective being vertically movable for focusing the image of the specimen, and an eyepiece for viewing the specimen directly using an observer's eye or a video camera for displaying the image on a monitor. Various conditioning devices may be inserted between the light source and the condenser such as filters to modify the image contrast such as spatial frequency, phase, polarization, and wavelength.

The specimen may be illuminated by transmitted light from the light source positioned behind the specimen held on the stage of the microscope which passes through the specimen forming an image of the specimen passing into an objective lens for viewing of specimens which are transparent or translucent as described above. Alternatively, specimens which are not transparent or translucent may be illuminated with incident light from a light source positioned on the same side of the specimen as the objective to bounce light off the specimen forming an image passing into the objective. A problem with both types of optical microscopes is that drops of liquids to be observed form a flattened hemispherical shape on a glass slide typically used to support specimens on the stage. The shape is basically the same as a hemisphere which is sliced upwardly from the bottom or largest diameter portion thereof. Therefore, the surface of the drop forms an angle with the slide typically greater than one-hundred-fifteen degrees. This angle deflects transmitted light away from the objective which causes a peripheral area of the drop in contact with the slide to appear as a dark ring which obscures viewing of the structure within the ring.

Koehler illumination was invented for illuminating specimens of microscopes to help microscopists to observe more the subtle features of specimens, including the dark peripheral ring of drop-shaped specimens. Koehler illumination utilizes, in addition to the components listed above for optical microscopes, an aperture diaphragm and a field diaphragm which are placed in the light beam produced by the light source ahead of the condenser. The aperture diaphragm allows adjustment of a numerical aperture of the light beam collimated onto the aperture diaphragm. The field diaphragm receives the light beam passing through the aperture diaphragm and allows adjustment of the light beam to illuminate an entire field of view of the microscope at the stage through the condenser. The subject and requirements of Koehler illumination is very technical and therefore is not discussed in detail herein. However, Koehler illumination is discussed in detail in the book "Microscopes: Basics and Beyond", Volume 1, by M Abramowitz, available from the Olympus Optical Corporation, which book is herein incorporated by reference in its entirety.

Koehler illumination provides a number of advantages over non-Koehler illumination including: 1) a homogeneously bright field of view; 2) the working numerical aperture of the condenser may be controlled separately from the size of the illuminated field; 3) the specimen may be illuminated by a converging set of light wave fronts which maximizes lateral resolution and permits fine optical sectioning and maximum special resolution; 4) a front focal plane of the condenser becomes conjugate with a rear focal plane of the objective lens for optimal contrast enhancement of fine specimen details; and 6) flare arising from the microscope optics and the barrels such as that of the objective is reduced without any vignetting.

While Koehler illumination provides benefits, particularly in adjusting the lighting conditions such as improved adjustable image contrast so as to better view finer specimen details, optimal image quality, including optimal image intensity, resolution, and contrast, depends upon a number of conditions being satisfied. Unfortunately, most microscopists are not skilled enough to make the perfect adjustments necessary for optimal image quality such that Koehler illumination is not fully utilized, resulting in non-Koehler illumination being used. The image quality of Koehler illumination depends on perfect adjustment of: 1) the alignment of the illumination components; 2) the focus of the condenser onto the specimen; 3) the aperture opening of the field diaphragm; and 4) the match between the numerical aperture of the condenser and the particular objective used. Regarding the last item an optimal condenser has a numerical aperture greater than or equal to the numerical aperture of the associated objective. However, since most microscopes use a rotary device having multiple objectives of different magnifications. An objective having the desired magnification may be individually rotated into the light path to receive the image of the specimen for observation. However, a condenser of a corresponding numerical aperture must be used for optimal image quality. Since condensers are very expensive and time is involved to change the condenser each time the objective is changed, non-optimal condensers are often used with the objectives. Also, the adjustments are labor-intensive even for microscopists skilled in such adjustments, the goal being to align all of the optical components on a common axis of the light beam, to focus the various lenses correctly for Koehler illumination, and to adjust the aperture and field diaphragms appropriately.

Shortcomings of the Prior Art

While various devices have been patented which attempt to alleviate the problems of Koehler illumination, including the high skill level required of the microscopist, the time involved in setting up the microscope for Koehler illumination, and the high cost of having an optimal condenser for each objective, there are quite a few shortcomings. One such device is the illuminator elements disclosed in U.S. Pat. No. 5,734,498 issued to Krasieva, et al. on Mar. 31, 1998. The illuminator elements comprise minute fluorescent and/or light-scattering bodies suspended in a plastic polymer matrix. The illuminator elements replace the condensers of the optical microscopes to eliminate the need for an optimal condenser for each condenser. Illuminator elements of a fluorescent type are used with a light source of a type which causes the fluorescent bodies to glow. The illuminator elements are stated to provide improved image quality while eliminating the necessity of using an optimal condenser for each objective. However, the illuminator elements must be specially made out of a plastic polymer with the desired minute bodies, are expensive to produce likely using special processes to randomly scatter the minute bodies throughout the polymer matrix, are subject to damage by abrasives during use due to the relatively low hardness of plastic polymers, and some require a special light source which provides the necessary light frequency to provide fluorescence of the fluorescent bodies.

There is a need for a light diffuser for use with optical microscopes the manufacture of which utilizes off-the-shelf raw materials, requires no expensive special processes to manufacture, is made of a harder material such as glass which is less subject to damage by abrasives during use, and which uses the standard light source without changing to a special light source.

SUMMARY OF INVENTION

1. Advantages of the Invention

One of the advantages of the present invention is that it provides a light diffuser the manufacture of which utilizes off-the-shelf raw materials.

Another advantage of the present invention is that it provides a light diffuser which requires no expensive special processes to manufacture.

A further advantage of the present invention that it provides a light diffuser which is made of a harder material which is less subject to damage by abrasives during use.

Yet another advantage of the present invention that it provides alight diffuser which uses the standard light source of the microscope without changing to a special light source.

Still another advantage of the present invention that it provides a method for operating a microscope using near Koehler illumination.

These and other advantages of the present invention may be realized by reference to the remaining portions of the specification, claims, and abstract.

2. Brief Description of the Invention

The present invention comprises a light diffuser for use in illumination systems of optical microscopes which utilize a light source to illuminate a specimen staged on the microscope for observation, an illumination system and an optical microscope which utilize the light diffuser for viewing specimens, and a method of illuminating specimens for observation using optical microscopes.

The light diffuser includes a light diffusing plate which includes a transparent base material operatively associated with a light diffusing material. The light diffusing material randomly breaks up light transmitted from the light source which passes through the base material into a multiplicity of scattered light rays comprising substantially spatially isotropic light. The light diffusing plate is positioned closely adjacent the specimen such that transmitted light which passes therethrough illuminates the specimen with the substantially spatially isotopic light. The isotropic light illuminates the specimen for observation evenly and without distinction as to direction such that substantially reduced diffraction shadows are visible through the microscope which obscure the specimen.

A preferred embodiment of the light diffuser has a light diffusing plate which comprises opal glass and a housing which retains the light diffusing plate. The light diffusing plate is disk-shaped, having a pair of oppositely disposed parallel substantially flat surfaces one of which receives light transmitted from the light source and another of which is positioned closely adjacent the specimen emitting the substantially spatially isotopic light. The housing is of a generally cylindrical shape with an upper end positionable closely adjacent the stage and a lower end distal therefrom. A generally cylindrically shaped bore extends through the housing from the upper end to the lower end. The upper end of the housing retains the light diffusing plate transversely within the bore. The lower end of the housing is threaded to adjustably removably engage a mating threaded portion of the microscope.

The illumination system is for optical microscopes which include a light-transmitting stage for supporting the specimen and a light-transmitting objective for receiving light illuminating the specimen which carries an image of the specimen for observation. The illumination system includes a light source, the light diffuser of the present invention, and an illumination lens system. The illumination lens system includes at least one lens disposed along a light path of a light beam produced by the light source for focusing the light beam from the light source through the light diffuser. The light diffuser illuminates the specimen with substantially spatially isotropic light which passes through the stage evenly and without distinction as to direction producing an image for observation having substantially reduced diffraction shadows visible through the microscope which obscure the specimen.

In a preferred embodiment of the illumination system the illumination lens system includes an aperture diaphragm and a field diaphragm. The aperture diaphragm is disposed along the light path and operatively associated with the lenses to allow adjustment of a numerical aperture of the light beam which is collimated onto the aperture diaphragm. The field diaphragm is disposed along the light beam and operatively associated with the lenses, which focus the light beam which passes through the aperture diaphragm through the field diaphragm, to allow adjustment of the light beam to illuminate an entire field of view of the microscope at the stage.

The optical microscope includes a light-transmitting stage for supporting the specimen, a light-transmitting objective for receiving light transmitted through the stage illuminating the specimen, and the illumination system of the present invention.

In a preferred embodiment of the microscope, the illumination system includes the aperture diaphragm and the field diaphragm. A microscope lens system receives the light with image transmitted through the objective and focuses the image carried by the light onto an imaging plane of a video camera. The microscope may be of an upright configuration wherein the objective is disposed above the stage, and wherein the light diffuser, the illumination lens system, and the light source are disposed below the stage or of an inverted configuration with the components reversed. A computer controls one or more functions of the microscope including image focus, objective selection, numerical aperture of the light beam, and illumination of the field of view.

The method of illuminating and observing a specimen disposed at a stage of an optical microscope for observation using the microscope includes the steps of: 1) providing a near Lambertian source of substantially spatially isotropic light; 2) illuminating the specimen with the substantially spatially isotopic light evenly and without distinction as to direction where the specimen is illuminated; 3) focusing an image of the specimen by adjusting a vertical distance between an objective and the stage: 4) adjusting positioning of the near Lambertian source of light to produce a desired image contrast which is directly proportional to a distance from the near Lambertian source of light to a focus plane of the specimen: 5) adjusting the diameter of an aperture of an aperture diaphragm to fine tune the image contrast which is inversely proportional to a diameter of the aperture of the aperture diaphragm: 6) adjusting the diameter of an aperture of a field diaphragm so that an on-screen shadow of the field diaphragm is just beyond the field-of-view of the microscope: and 7) observing the specimen illuminated with the substantially spatially isotropic light through the microscope with substantially reduced diffraction shadows visible which obscure the specimen.

The above description sets forth, rather broadly, the more important features of the present invention so that the detailed description of the preferred embodiment that follows may be better understood and contributions of the present invention to the art may be better appreciated. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

Preferred embodiments of the present invention are shown in the accompanying drawings wherein.

DESCRIPTION OF THE PREFERRED EMBODIMENT

The present invention comprises an improved light diffuser for a microscope illumination system for microscopy systems, illumination systems and microscopes which utilize the light diffuser, and a method of use thereof.

Koehler Illumination in a Conventional Optical Microscope

TERMS

Figure 1:
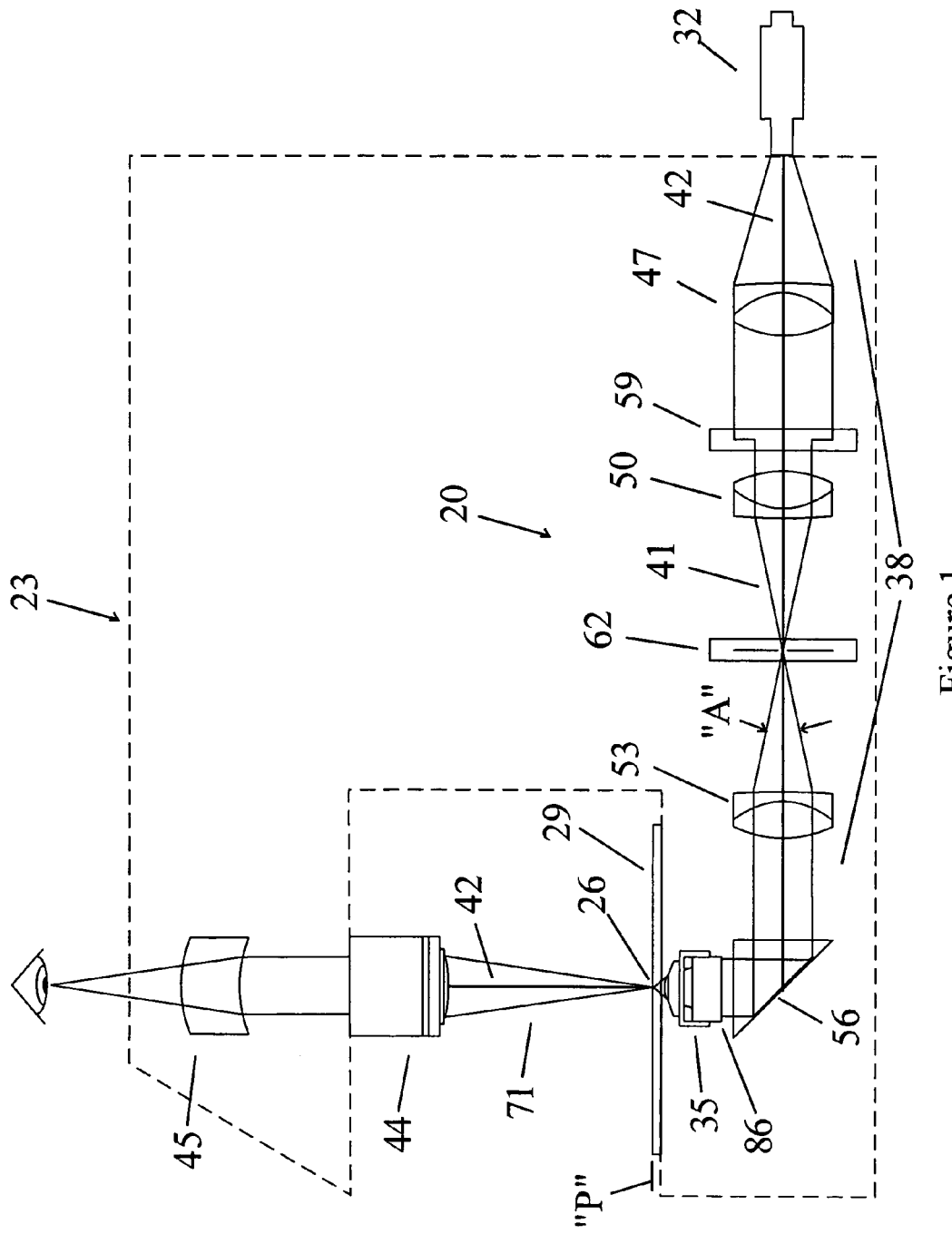
FIG. 1 is a diagrammatic view of an upright microscope which utilizes Koehler illumination for direct viewing of a specimen through an objective and an eyepiece which uses a prior art condenser of a transmitted light illumination system to direct a light beam from a light source through the condenser onto the specimen supported on a stage for viewing.

20. [microscope] Koehler illumination system
23. microscope
26. specimen
29. [microscope] stage
32. [illumination system] light source
35. [illumination system] condenser
38. [illumination system] illumination lens system
41. light beam
42. light path
44. [microscope] objective
45. [microscope] eyepiece
47. [illumination lens system] lens
50. [illumination lens system] lens
53. [illumination lens system] lens
56. [illumination lens system] right-angle light deflector
59. [illumination lens system] aperture diaphragm
62. [illumination lens system] field diaphragm
68. [condenser] housing
71. [condenser housing] bore
74. [condenser housing] upper end
77. [condenser] lens
80. [condenser] lens
83. [condenser housing] lower end
86. [microscope] mating portion
P focus plane of specimen
89. [objective] housing
92. [objective housing] bore
95. [objective] lens
98. [objective] lens
101. [objective housing] upper end
104. [objective housing] annular flange
107. [eyepiece] mating portion
110. [microscope] nearKoehler illumination system
113. [illumination system] light diffuser
116. [light diffuser] housing
119. [diffuser housing] bore
122. [diffuser housing] upper end
125. [light diffuser] light diffusing plate
126. [plate] flat surface
127. [plate] flat surface
128. [diffuser housing] lower end
129. [microscope] mating threaded portion
131. scattered light ray
134. upright optical video microscope
137. [microscope] video camera
140. [microscope] lens system
143. [lens system] camera relay lens
146. [camera] imaging plane
149. inverted optical video microscope Referring to FIG. 1, therein is shown a Koehler illumination system 20 of a conventional upright optical microscope 23 (dotted lines) which illuminates a specimen 26 supported on a light-transmitting stage 29 using transmitted light. The illumination system 20 includes a light source 32, a prior art substage condenser 35, and an illumination lens system 38 for transmitting and focusing a light beam 41 produced from the light source 32 along a light path 42 from the light source 32 through the condenser 35. The light source 32 is typically an incandescent tungsten lamp, an external source of daylight, or an optical fiber which transmits the light beam 41 from a remote light source (not shown), though it may be a built-in filament or other type of lamp. Condenser 35 is positioned beneath the stage 29 to direct the light beam 41 upwardly through the stage 29 and the specimen 26 into a light-transmitting objective 44 to receive light illuminating the specimen 26 which carries an image of the specimen 26 for observation. The objective 44 is connected to an eyepiece 45 for viewing through a person's eye.

The illumination lens system 38 is positioned horizontally under the stage 29 and typically includes a plurality of lenses 47, 50, and 53 which direct the light beam 41 from the light source 32 to a right-angle light deflector 56 disposed along the light path 42 to receive and bend the light beam 41 upwardly at a right angle through the condenser 35. The light deflector 56 preferably comprises a prism or mirror. An aperture diaphragm 59 of the lens system 38 is disposed along the light path 42 and associated with the lenses 47,50, and 53 to allow adjustment of a numerical aperture of the light beam 41 collimated onto the aperture diaphragm 59. A field diaphragm 62 is disposed along the light beam 41 and associated with the lenses 47,50, and 53 which focus the light beam 41 that passes through the aperture diaphragm 59 through the field diaphragm 62 to allow adjustment of the light beam 41 to illuminate an entire field of view of the microscope 23 at the stage 29, the lens 53 which collimates the light beam 41 into the condenser 35. Lens 47 collimates the light beam 41 from the light source 32 onto the aperture diaphragm 59. The lenses 50 and 53 focus the light beam 41 which passes through the aperture diaphragm 59 through the field diaphragm 62, collimate the light beam 41, and direct it onto the light deflector 56 which bends the light beam 41 through the condenser 35. The aperture diaphragm 59 allows control of the angle of the light beam 41 along the light path 42 of the light beam 41 passing through field diaphragm 62.

Figure 2:
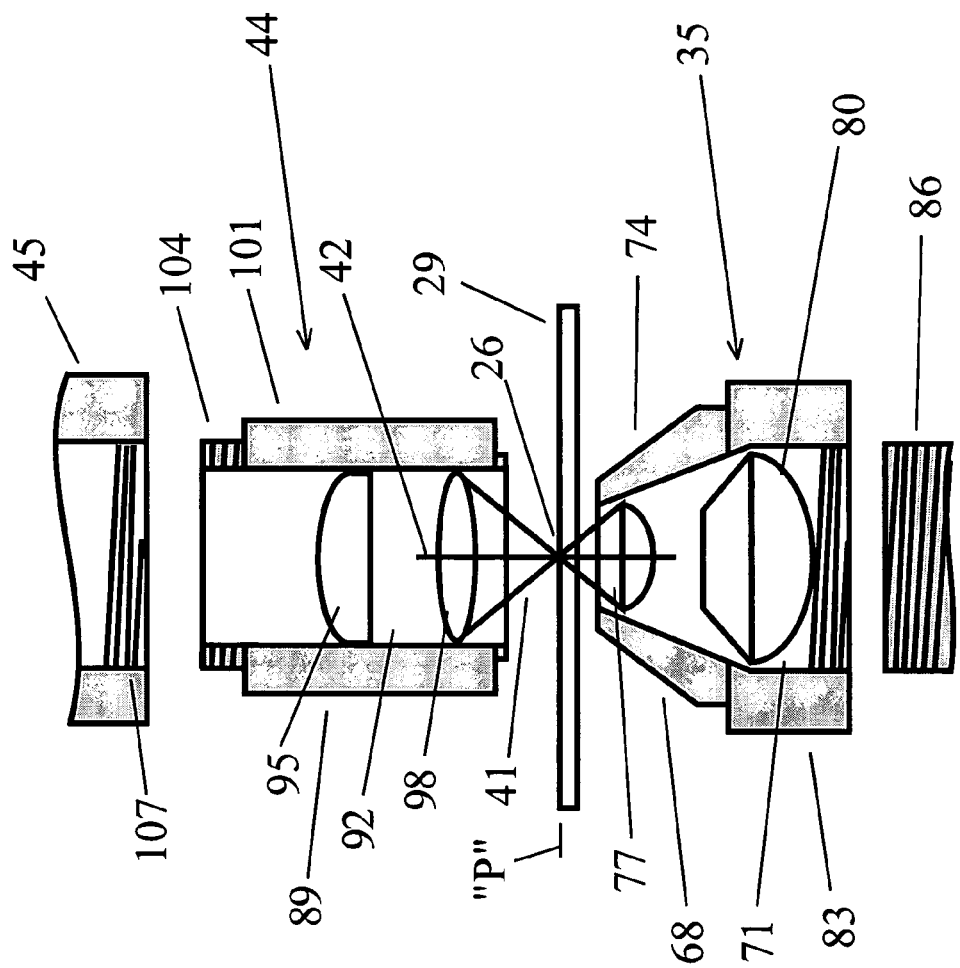
FIG. 2 is a side elevational view in partial vertical cross-section of the objective and the condenser.

Referring to FIG. 2, therein is shown an enlarged view of the condenser 35 positioned beneath the stage 29, and the objective 44 and eyepiece 45 positioned above the stage 29. The condenser 35 includes a generally frusto-conical shaped housing 68 having a generally frusto-conical shaped bore 71 extending therethrough. An upper end 74 of the housing 68 retains a pair of lenses 77 and 80 within the bore 71. A lower end 83 of housing 68 removably engages a mating portion 86 of the microscope 23. The number of lenses in the condenser 35 typically is from one to three. The upper end 74 of housing 68 is positioned closely adjacent the stage 29 with the lower end 83 distal therefrom.

The objective 44 includes a housing 89 having a bore 92 extending therethrough. A pair of lenses 95 and 98 are retained within the bore 92 of housing 89. An upper end 101 of housing 89 has an annular flange 104 to removably engage a mating portion 107 of the eyepiece 45. The light beam 41 is shown traveling from the lens 77 of condenser 35 through the specimen 26 on stage 29 and the lenses 95 and 98 of the objective 44. The objective 44 and eyepiece are vertically movable to focus images carried by the light beam 41.

The illumination system 20 of the microscope 23 is configured by optimizing the focus of condenser 35, optimizing the opening of the aperture diaphragm 59, and optimizing the opening of the field diaphragm 62. The optimization procedure for Koehler illumination includes: 1) focusing the image of the specimen viewed through the eyepiece 45 by adjusting the vertical distance between the objective 44 and the stage 29; 2) positioning the condenser 35 at a point where an edge of the aperture (not shown) of the field diaphragm 62 is in focus; 3) opening the aperture (not shown) of the aperture diaphragm 59 to from two-thirds to four-fifths of an opening (not shown) of the condenser 35; and 4) setting the aperture of the field diaphragm 62 so that an on-screen shadow (not shown) of the field diaphragm 62 is just beyond the field-of-view of the microscope 23. The procedure is necessary every time a different objective of the microscope 23 is used, particularly so the size of the aperture of the aperture diaphragm 59 is changed so the numerical aperture of the aperture diaphragm 59 matches that of the objective 44. There are major drawbacks to Koehler illumination including the fact that the image quality of Koehler illumination depends on perfect adjustment of: 1) the alignment of the illumination components; 2) the focus of the condenser onto the specimen; 3) the aperture opening of the field diaphragm; and 4) the match between the numerical aperture of the condenser and the particular objective used. This requires both a matching condenser 35 for each objective 44, and a skilled microscopist to make the required adjustments. If the matching condenser 35 is not available, such as due to the great expense involved in purchasing multiple condensers 35, and/or if the microscopist does not have the required skill level, the result is inferior image intensity, resolution and/or contrast.

Near-Koehler Illumination in an Upright Optical Microscope

Figure 3:
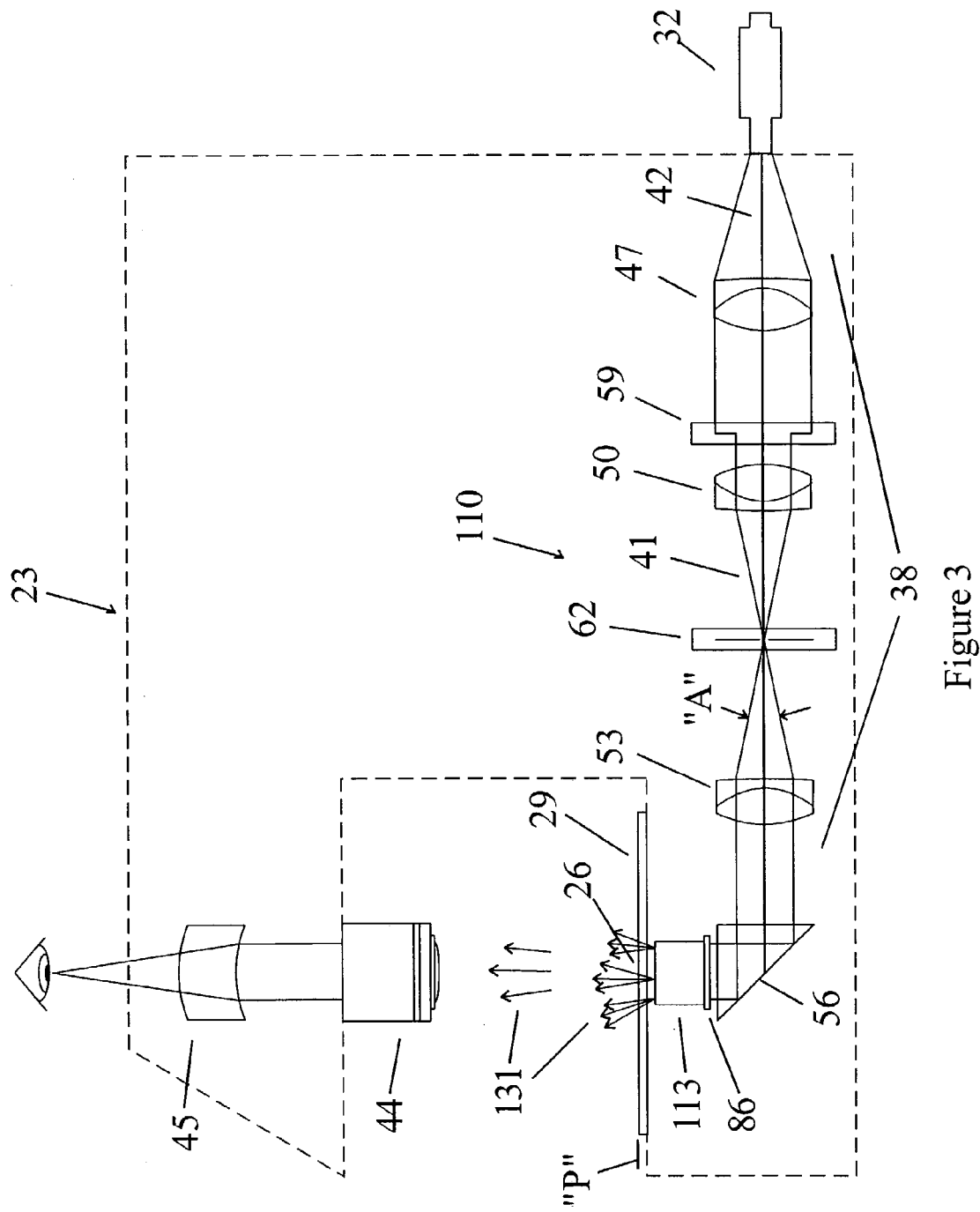
FIG. 3 is a diagrammatic view of the upright microscope that uses a light diffuser of the present invention which replaces the condenser to produce spatially isotropic light to illuminate the specimen on the stage.

A near-Koehler illumination system 110 of the present invention which utilizes a light diffuser of the present invention, designated generally at 113, is shown in FIG. 3 as used with an upright optical microscope 23 (dotted lines) of the present invention which illuminates the specimen 26 on the stage 29 of the microscope 23. The illumination system 110 is said to be near-Koehler since most, but not all of the requirements for Koehler illumination are met (see the above-referenced book which explains the detailed requirements for Koehler illumination). The illumination system 110 achieves variable contrast in such a manner to provide optimization of microscopic imaging of specimens within liquid drops. The illumination system 110 includes the light source 32, the light diffuser 113, and the lens system 38 for transmitting the light beam 41 from the light source 32 to the light diffuser 113. Light diffuser 113 is positioned beneath the stage 29 to diffuse and scatter the light beam 41 upwardly through the stage 29 and the specimen 26 into the objective 44.

The lens system 38 is positioned horizontally under the stage 29 and typically includes the plurality of lenses 47, 50, and 53 which direct the light beam 41 from the light source 32 to the right-angle light deflector 56 disposed along the light path 42 to receive and bend the light beam 41 upwardly at a right angle through the light diffuser 113 to diffuse and scatter the light beam 41 upwardly through the stage 29 and the specimen 26 into the objective 44. The aperture diaphragm 59 of the lens system 38 is disposed along the light path 42 and associated with the lenses 47,50, and 53 to allow adjustment of a numerical aperture of the light beam 41 collimated onto the aperture diaphragm 59. The field diaphragm 62 is disposed along the light beam 41 and associated with the lenses 47, 50, and 53 which focus the light beam that passes through the aperture diaphragm 59 through the field diaphragm 62 to allow adjustment of the light beam 41 to illuminate an entire field of view of the microscope 23 at the stage 29, the lens 53 which collimates the light beam 41 into the light diffuser 113. Lens 47 collimates the light beam 41 from the light source 32 onto the aperture diaphragm 59. The lenses 50 and 53 focus the light beam 41 which passes through the aperture diaphragm 59 through the field diaphragm 62, collimate the light beam 41, and direct it onto the deflector 56 which bends the light beam 41 through the light diffuser 113. The aperture diaphragm 59 allows control of the angle of the light beam 41 along the light path 42 of the light beam 41 passing through field diaphragm 62.

Figure 4:
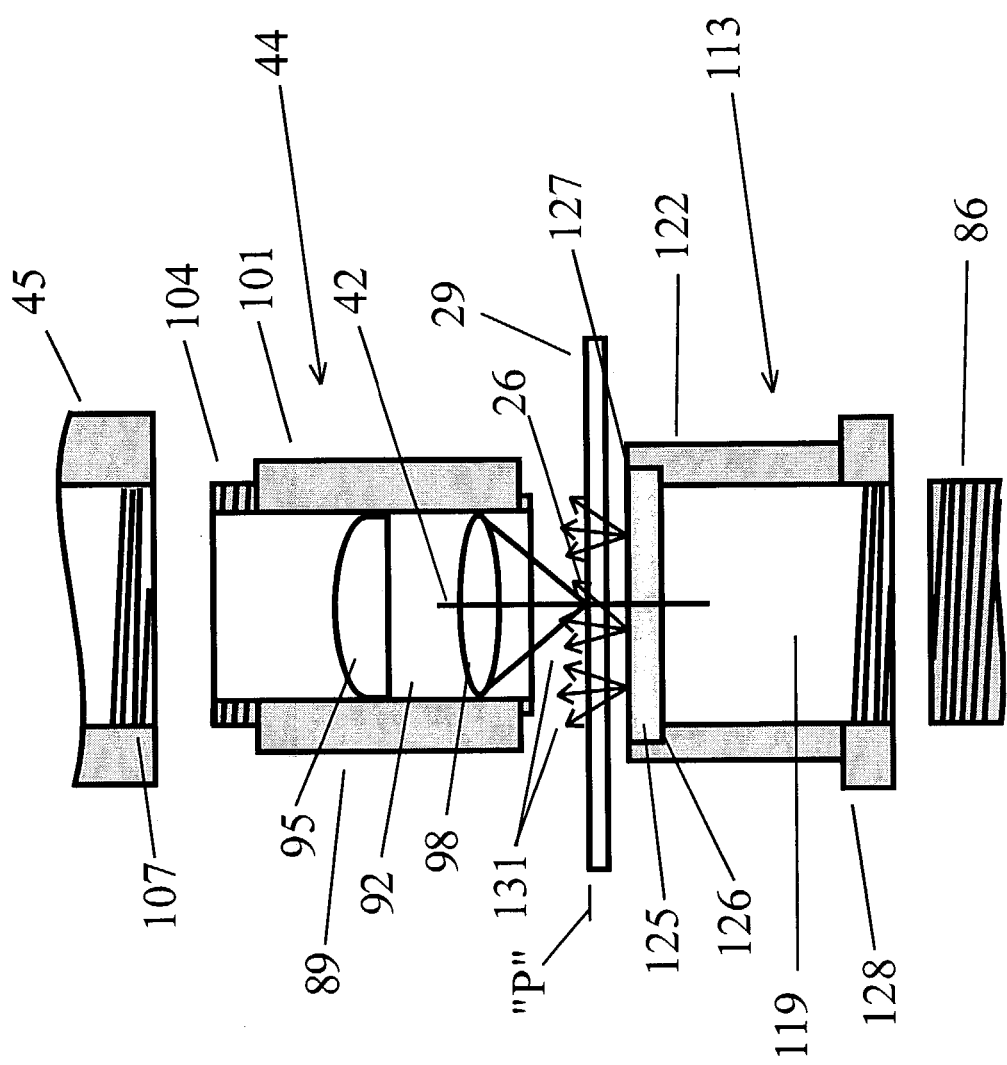
FIG. 4 is a side elevational view in partial vertical cross-section of the objective and the light diffuser.

Referring to FIG. 4, therein is shown an enlarged view of the light diffuser 113 positioned beneath the stage 29 closely adjacent the specimen 26, and the objective 44 positioned above the stage 29. The light diffuser 113, replaces the condenser 35 as the final optical component in the path of the traditional Koehler illumination system. The light diffuser 113 includes a generally cylindrically shaped housing 116 having a generally cylindrically shaped bore 119 extending therethrough. An upper end 122 of the housing 116 retains a circular, disk-shaped light diffusing plate 125 within the bore 119. The light diffusing plate 125 includes a pair of oppositely disposed parallel, substantially flat surfaces 126 and 127, one of which receives light transmitted from the light source 32 and the other of which is positioned closely adjacent the specimen 26 and emits substantially spatially isotopic light. The light diffusing plate 125 comprises a substantially, or near Lambertian source of light (i.e. produces the same intensity light from all directions) by randomly breaking up the light beam 41 transmitted from the light source 32 which passes therethrough into a multiplicity of scattered light rays comprising substantially spatially isotropic light. The upper end 122 of housing 116 is positioned closely adjacent the stage 29 with a lower end 128 distal therefrom. The light diffusing plate 125 is thus positioned closely adjacent the specimen 26 such that transmitted light which passes therethrough illuminates the specimen 26 with the substantially spatially isotropic light evenly and without distinction as to direction where the specimen 26 is illuminated for observation such that substantially reduced diffraction shadows are visible through the microscope which obscure the specimen 26. The lower end 128 of housing 116 is internally threaded to adjustably removably engage a mating threaded portion 129 of the microscope 23. The threaded engagement of the housing 116 with the mating threaded portion 129 of the microscope 23 allows the vertical distance of the light diffusing plate 125 to the focus plane "P" of the specimen 26 to be adjusted.

The light diffusing plate 125 is preferably opal glass which is commercially available, being similar to ground glass of a thickness of between about 2.5 mm and 6.0 mm, but with one surface flashed with a milky white "opal" coating between about 0.25 mm to 0.65 mm thick to diffuse light evenly and achieve a near Lambertian source. One ready source of opal glass is Edmund Industrial Optics Corporation of Barrington, N.J. Other near optical quality materials which provide near Lambertian light may also be used for light diffusing plate 125.

The objective 44 includes the housing 89 having the bore 92 extending therethrough. The pair of lenses 95 and 98 are retained within the bore 92 of housing 89. The upper end 101 of housing 89 has the annular flange 104 to removably engage the mating portion 107 of the eyepiece 45. The light diffuser 113 receives the light beam 41 and the light diffusing plate 125 randomly breaks up, diffuses, and scatters the light beam transmitted from the light source 32 which passes therethrough into a multiplicity of scattered light rays 131 comprising substantially spatially isotropic light which passes through the stage 29 to illuminate the specimen 26 evenly and without distinction as to direction where the specimen 26 is illuminated producing an image for observation having substantially reduced diffraction shadows visible through and the lenses 95 and 98 of the objective 44 of the microscope 23 which obscure the specimen 26. The objective 44 and the eyepiece 45 are vertically movable to focus images carried by the light beam 41. The individual optical components of the illumination system 110 as well as those that follow may be removed and replaced with other components, including lenses, polarizers, and/or filters to fit the particular application.

The illumination system 110 which utilizes a light diffuser 113 with the optical microscope 23 eliminates the need for a matching condenser 35 for each objective 44 since no condenser 35 is used. The illumination system 110 of the microscope 23 is configured by adjusting the opening of the aperture diaphragm 59 and of the field diaphragm 62. The optimization procedure for the near Koehler illumination includes: 1) focusing the image of the specimen viewed through the eyepiece 45 by adjusting the vertical distance between the objective 44 and the stage 29; 2) positioning the light diffuser 113 a distance from a focus plane of the specimen (not shown) to produce the desired image contrast; 3) adjusting the aperture of the aperture diaphragm 59 to fine tune the image contrast; and 4) setting the aperture of the field diaphragm 62 so that an on-screen shadow (not shown) of the field diaphragm 62 is just beyond the field-of-view of the microscope 23. Image contrast is inversely proportional to the diameter of the aperture of the aperture diaphragm 59 and directly proportional to the distance from the near Lambertian source, light diffusing plate 125, to the focus plane of the specimen 26. While the procedure is necessary every time a different objective 44 of the microscope 23 is used, operation of the microscope 23 is greatly simplified by eliminating the need for perfect alignment of the illuminating light source 32 and condenser 35, and obviously the need for having a condenser 35 of a matching numerical aperture for each objective 44. The skill level required of the microscopist is also drastically reduced.

Figure 5:
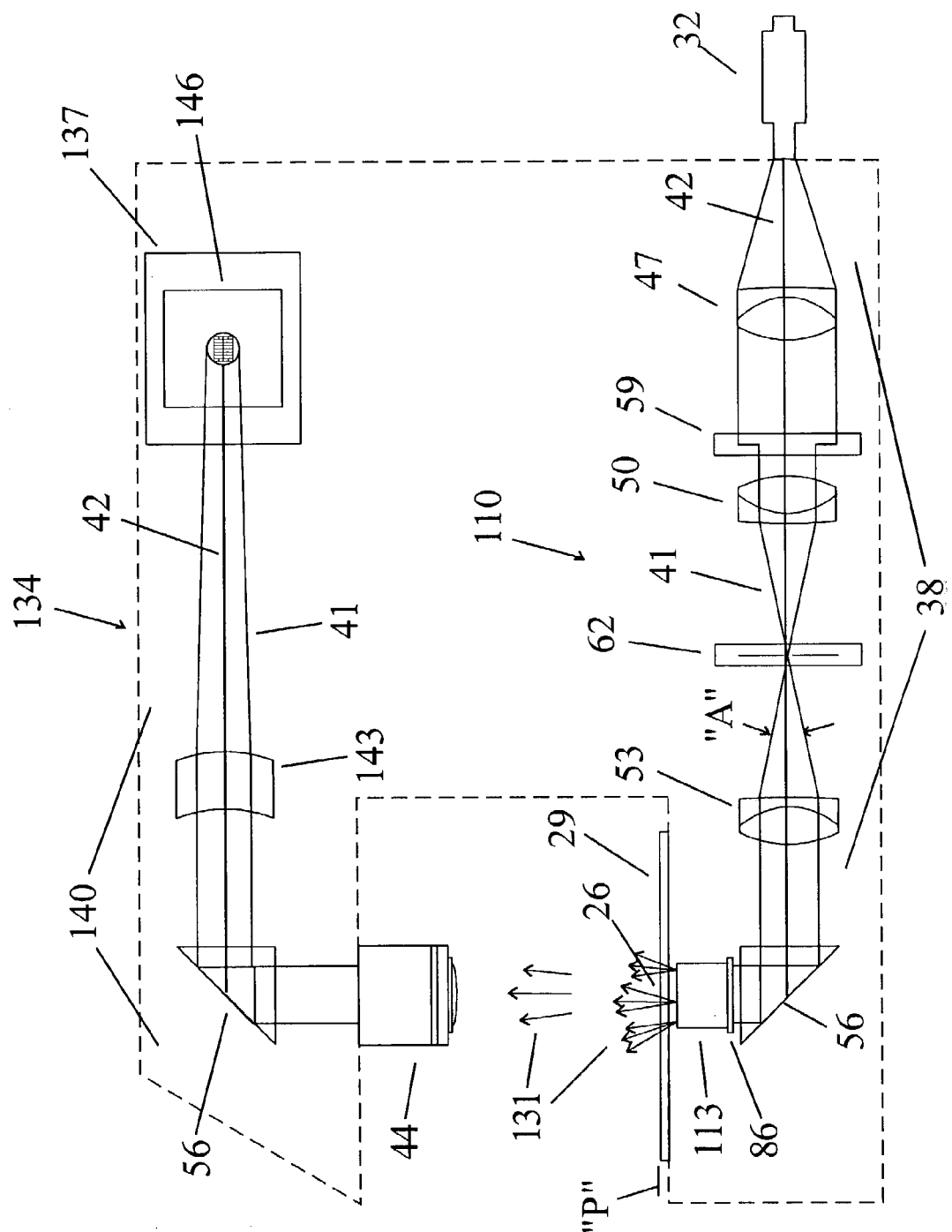
FIG. 5 is a diagrammatic view of an upright microscope for indirect viewing of the specimen using a video camera and monitor which uses the light diffuser.

Near-Koehler Illumination in a Computer-Controlled Upright Optical Video Microscope The illumination system 110 of the present invention which utilizes the light diffuser 113 of the present invention is shown in FIG. 5 as used with a computer-controlled upright optical video microscope 134 (dotted lines) of the present invention. The microscope functions such as image focus, objective selection, numerical aperture of the light beam by adjusting the aperture diaphragm, and illumination of the field of view at the stage by adjusting the field diaphragm are computer controlled such as disclosed in my U.S. Pat. No. 6,400,395 issued on Jun. 4, 2002; U.S. Pat. No. 6,396,532 issued on May 28, 2002; and U.S. Pat. No. 6,268,957 issued on Jul. 31, 2001 the disclosures of which are incorporated herein by reference in their entirety. In the microscope 134 the eyepiece 45 has been replaced with a video camera 137 and a lens system 140. In video microscope 134 of an upright configuration the objective 44 and the lens system 140 are disposed above the stage 29. The light diffuser 113, the illumination lens system 38, and the light source 32 are disposed below the stage 29. The threaded engagement of the housing 116 with the mating threaded portion 129 of the microscope 134 allows the vertical distance of the light diffusing plate 125 to the focus plane "P" of the specimen 26 to be adjusted.

The illumination system 110 includes the light source 32, the light diffuser 113 of the present invention, and the lens system 38 for transmitting the light beam 41 from the light source 32 to the light diffuser 113. Light diffuser 113 is positioned beneath the stage 29 closely adjacent the specimen 26, to diffuse and scatter the light beam 41 upwardly through the stage 29 and the specimen 26 into the objective 44.

The lens system 38 is positioned horizontally under the stage 29 and typically includes the plurality of lenses 47, 50, and 53 which direct the light beam 41 from the light source 32 to the right-angle light deflector 56 disposed along the light path 42 to receive and bend the light beam 41 upwardly at a right angle through the light diffuser 113 to diffuse and scatter the light beam 41 upwardly through the stage 29 and the specimen 26 into the objective 44. The aperture diaphragm 59 of the lens system 38 is disposed along the light path 42 and associated with the lenses 47,50, and 53 to allow adjustment of a numerical aperture of the light beam 41 collimated onto the aperture diaphragm 59. The field diaphragm 62 is disposed along the light beam 41 and associated with the lenses 47, 50, and 53 which focus the light beam 41 that passes through the aperture diaphragm 59 through the field diaphragm 62 to allow adjustment of the light beam 41 to illuminate an entire field of view of the microscope 23 at the stage 29, the lens 53 which collimates the light beam 41 into the light diffuser 113. Lens 47 collimates the light beam 41 from the light source 32 onto the aperture diaphragm 59. The lenses 50 and 53 focus the light beam 41 which passes through the aperture diaphragm 59 through the field diaphragm 62, collimate the light beam 41, and direct it onto the light deflector 56 which bends the light beam 41 through the light diffuser 113. The aperture diaphragm 59 allows control of an angle of the light beam 41 along the light path 42 of the light beam 41 passing through field diaphragm 62.

The video camera 137 and the lens system 140 are positioned horizontally above the stage 29. The lens system 140 typically includes a camera relay lens 143 which receives the light beam 41 with image transmitted through the objective 44 and focus the image onto a second right-angle light deflector 56 such as a prism or mirror which deflects the light beam 41 comprised of the light rays 131 which enter the objective 44 horizontally at a right angle from the light diffuser 113 through the lens 143 onto an imaging plane 146 of the video camera 137. The imaging plane 146 comprises a multiplicity of photodetectors (not shown) of the video camera 137, which may be used to transmit the image to a video monitor (not shown). The objective 44, the second right angle light deflector 56, the lens 143, and the video camera 137 are vertically movable under computer control to focus images carried by the light beam 41.

The microscope illumination system 110 which utilizes the light diffuser 113 of the video microscope 134 has the advantages listed above and the optimization procedure for the near Koehler illumination is the same.

Figure 6:
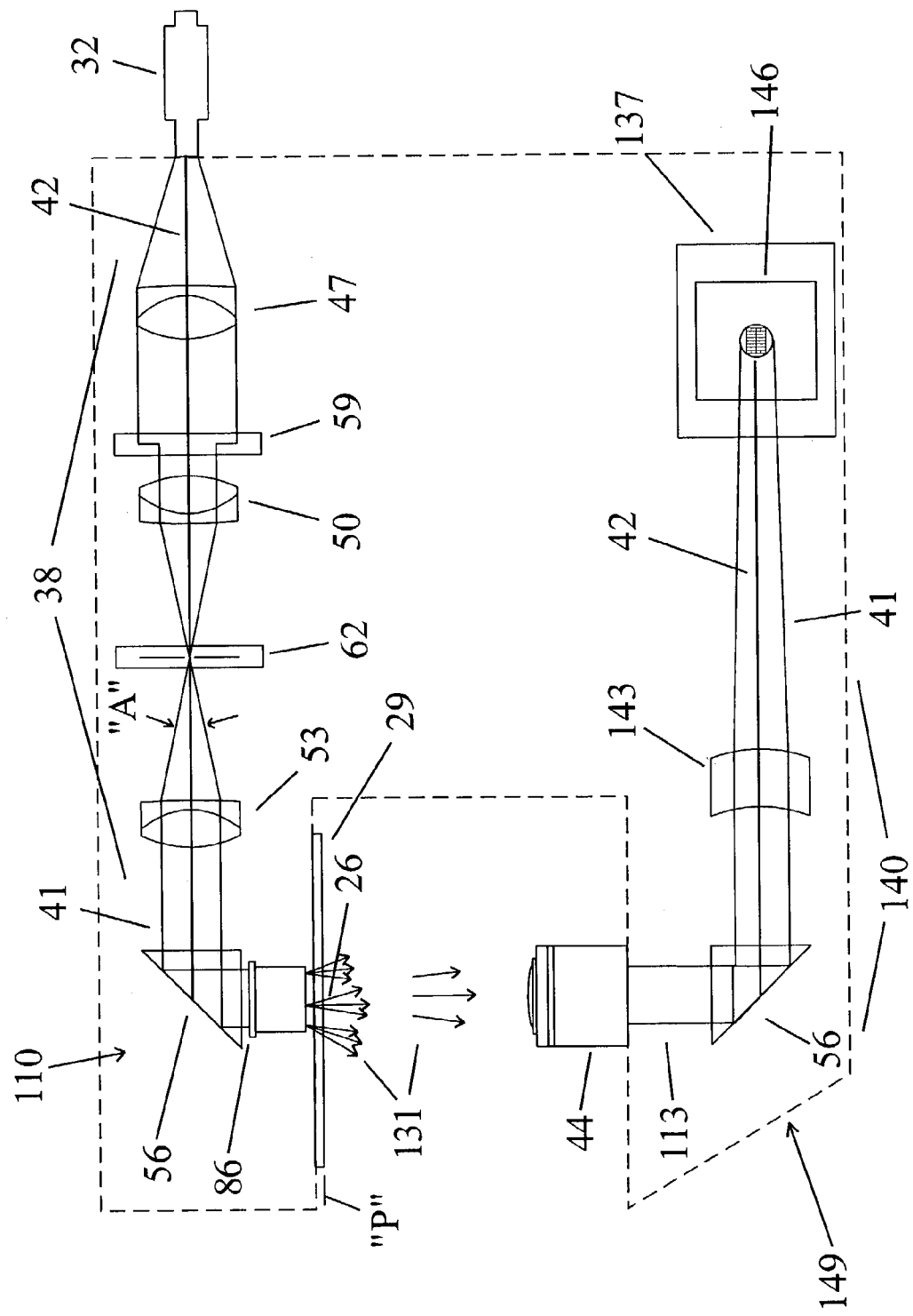
FIG. 6 is a diagrammatic view of an inverted microscope for indirect viewing of the specimen using the video camera and monitor which uses the light diffuser.

Near-Koehler Illumination in a Computer-Controlled Inverted Optical Video Microscope The microscope illumination system 110 which utilizes the improved light diffuser 113 of the present invention is shown in FIG. 6 as used with a conventional computer-controlled inverted optical video microscope 149 (dotted lines) wherein the microscope functions such as image focus, objective selection, numerical aperture of the light beam by adjusting the aperture diaphragm 59, and illumination of the field of view at the stage 29 by adjusting the field diaphragm 62 are computer controlled as described above. In the microscope 149 the eyepiece 45 has been replaced with the video camera 137 and the lens system 140. In the video microscope 149 of an inverted configuration the objective 44 and the microscope lens system 140 are disposed below the stage 29. The light diffuser 113, the illumination lens system 38, and the light source 32 are disposed above the stage 29. The threaded engagement of the housing 116 with the mating threaded portion 129 of the microscope 149 allows the vertical distance of the light diffusing plate 125 to the focus plane "P" of the specimen 26 to be adjusted.

The illumination system 110 includes the light source 32, the light diffuser 113 of the present invention, and the lens system 38 for transmitting the light beam 41 from the light source 32 to the light diffuser 113. However, the light diffuser 113 is positioned above the stage 29 to diffuse and scatter the light beam 41 downwardly through the stage 29 and the specimen 26 into the objective 44 disposed below the stage 29. The aperture diaphragm 59 of the lens system 38 is disposed along the light path 42 and associated with the lenses 47,50, and 53 to allow adjustment of a numerical aperture of the light beam 41 collimated onto the aperture diaphragm 59. The field diaphragm 62 is disposed along the light beam 41 and associated with the lenses 47,50, and 53 which focus the light beam 41 that passes through the aperture diaphragm 59 through the field diaphragm 62 to allow adjustment of the light beam 41 to illuminate an entire field of view of the microscope 23 at the stage 29, the lens 53 which collimates the light beam 41 into the light diffuser 113. Lens 47 collimates the light beam 41 from the light source 32 onto the aperture diaphragm 59. The lenses 50 and 53 focus the light beam 41 which passes through the aperture diaphragm 59 through the field diaphragm 62, collimate the light beam 41, and direct it onto the deflector 56 which bends the light beam 41 through the light diffuser 113. The aperture diaphragm 59 allows control of the angle of the light beam 41 along the light path 42 of the light beam 41 passing through field diaphragm 62.

The video camera 137 and the lens system 140 are positioned horizontally below the stage 29. The lens system 140 typically includes the lens 143 which receives the light beam 41 with image transmitted through the objective 44 and focus the image onto the second right-angle deflector 56 such as a prism or mirror which deflects the light beam 41 comprised of the light rays 131 which enter the objective 44 horizontally at a right angle from the light diffuser 113 through the lens 143 onto an imaging plane 146 of the video camera 137. The imaging plane 146 comprises a multiplicity of photodetectors (not shown) of the video camera 137, which may be used to transmit the image to a video monitor (not shown). The objective 44, the second light deflector 56, the lens 143, and the video camera 137 are vertically movable under computer control to focus images carried by the light beam 41.

The microscope illumination system 110 which utilizes the light diffuser 113 of the video microscope 149 has the advantages listed above and the optimization procedure for the near Koehler illumination is the same.

Method of Near-Koehler Illumination in an Optical Microscope

A preferred method of the present invention for illuminating and observing a specimen disposed at the stage of the optical microscope for observation using the microscope, comprises the steps of: 1) providing a light diffusing plate which includes a transparent base material operatively associated with a light diffusing material adapted to randomly break up light transmitted from the light source which passes through the base material into a multiplicity of scattered light rays comprising substantially spatially isotropic light; 2) illuminating the light diffusing plate with light from a light source such that transmitted light which passes therethrough illuminates the specimen with the substantially spatially isotopic light evenly and without distinction as to direction where the specimen is illuminated; 3) focusing an image of the specimen by adjusting a vertical distance between an objective and the stage: 4) adjusting positioning of the light diffusing plate to produce a desired image contrast which is directly proportional to a distance from the light diffusing plate to a focus plane of the specimen: 5) adjusting the diameter of an aperture of an aperture diaphragm to fine tune the image contrast which is inversely proportional to a diameter of the aperture of the aperture diaphragm: 6) adjusting the diameter of an aperture of a field diaphragm so that an on-screen shadow of the field diaphragm is just beyond the field-of-view of the microscope: and 7) observing the specimen illuminated with the substantially spatially isotopic light through the microscope with substantially reduced diffraction shadows visible which obscure the specimen. The method is preferably conducted using the opal glass such that the step of providing a light diffusing plate comprises providing the opal glass.

CONCLUSION

It can now be seen that the present invention solves many of the problems associated with the prior art. The present invention provides a light diffuser the manufacture of which utilizes off-the-shelf raw materials. The present invention further provides a light diffuser which requires no expensive special processes to manufacture. The present invention still further provides a light diffuser which is made of a harder material which is less subject to damage by abrasives during use. The present invention still further provides a light diffuser which uses the standard light source of the microscope without changing to a special light source. The present invention still further provides a method for operating a microscope using near Koehler illumination. These and other advantages of the present invention may be realized by reference to the remaining portions of the specification, claims, and abstract.

Although the description above contains many specifications, these should not be construed as limiting the scope of the invention but as merely providing illustrations of some of presently preferred embodiments of this invention. Thus, many variations to the light diffuser, the illumination system, the microscopes, and the method of the present invention are possible while staying within the same inventive concept. The light diffusing plate may be used without a housing, such as being clamped in place to the microscope or the illumination system. Other types of housings may be used to hold the light diffusing plate. The light diffusing plate may have oppositely disposed surfaces one or both of which are concave, convex, or otherwise curved, and be of other than disk shaped. Likewise, the light diffusing plate may be color tinted, may include respective inner and outer portions of differing tints to highlight the specimen, or have one of the inner and outer portions opaque to provide lightfield and darkfield illumination of the specimen. The field diaphragm of the illumination system may be replaced by a conventional adjustable iris built into the housing of the light diffuser disposed between the light diffusing plate and the light deflector. While the light diffuser is shown as used with microscopes in which the specimen is illuminated by transmitted light, the light diffuser and/or the light diffusing plate alone maybe adapted for use with microscopes which illuminate specimens with incident light. In such microscopes which utilize incident light, the light source and light diffusing plate are positioned on the same side of the specimen as the objective to bounce light off the specimen forming an image passing into the objective, which provides better illumination for opaque specimens. As such, the light diffusing plate supplying the spatially isotropic light from the light beam would be placed away from the light beam which conveys the image of the specimen through the objective for observation so as to not obscure and scatter the image. Thus, the scope of the invention should be determined by the appended claims and their legal equivalents rather than by the examples given.

What is claimed is:

1. A light diffuser for use in illumination systems of optical microscopes which utilize a light source to illuminate a specimen supported on a light-transmitting stage for observation, comprising:

a light diffusing plate which includes a transparent base material operatively associated with a light diffusing material adapted to randomly break up light transmitted from the light source which passes through said base material into a multiplicity of scattered light rays comprising substantially spatially isotropic light;

a housing having an upper end positionable closely adjacent the stage and a lower end distal therefrom, said housing having a bore extending therethrough from said upper end to said lower end, said upper end of said housing which retains said light diffusing plate transversely within said bore, said lower end of said housing being adapted to adjustably removably engage a mating portion of the microscope to allow adjustment of a distance from said light diffusing plate to a focus plane of the specimen to adjust image contrast; and wherein said light diffusing plate is adapted to be positioned closely adjacent the specimen such that transmitted light which passes therethrough to illuminate the specimen with the substantially spatially isotopic light evenly and without distinction as to direction where the specimen is illuminated producing an image for observation having substantially reduced diffraction shadows visible through the microscope which obscure the specimen.

2. The light diffuser defined in claim 1, wherein the housing and the bore are both generally cylindrically shaped, the light diffusing plate is disk-shaped, and the lower end of said housing is threaded to engage a mating threaded portion of the microscope.

3. The light diffuser defined in claim 2, wherein the light diffusing plate comprises opal glass having a pair of oppositely disposed parallel substantially flat surfaces one of which receives light transmitted from the light source and another of which is positioned closely adjacent the specimen emitting the substantially spatially isotopic light.

4. An illumination system for optical microscopes which include a light-transmitting stage for supporting a specimen and a light-transmitting objective adapted to receive light illuminating the specimen which carries an image of the specimen for observation, the illumination system comprising:

a light source for producing a light beam to illuminate the specimen staged on the microscope for observation;

a light diffusing plate adapted to be positioned closely adjacent the specimen to receive the light beam which includes a transparent base material operatively associated with a light diffusing material adapted to randomly break up, difuse, and scatter the light beam transmitted from said light source which passes therethrough into a multiplicity of scattered light rays comprising substantially spatially isotropic light;

a housing having an upper end positionable closely adjacent the stage and a lower end distal therefrom, said housing having a bore extending therethrough from said upper end to said lower end, said upper end of said housing which retains the light diffusing plate transversely within said bore, said lower end of said housing being adapted to adjustably removably engage a mating portion of the microscope to allow adjustment of a distance from said light diffusing plate to a focus plane of the specimen to adjust image contrast;

an illumination lens system adapted for focusing the light beam along a light path from said light source through said light diffuser comprising at least one lens disposed along said light path;

an aperture diaphragm disposed along the light path and operatively associated with said lenses to allow adjustment of a numerical aperture of the light beam collimated onto said aperture diaphragm, a field diaphragm disposed along the light beam and operatively associated with said lenses which focus the light beam which passes through said aperture diaphragm through said field diaphragm to allow adjustment of the light beam to illuminate an entire field of view of the microscope at said stage, said lenses which collimate the light beam onto the light diffuser; and wherein the isotropic light passing through said light diffusing plate passes through the stage to illuminate the specimen with the substantially spatially isotropic light evenly and without distinction as to direction where the specimen is illuminated producing an image for observation having substantially reduced diffraction shadows visible through the microscope which obscure the specimen.

5. The illumination system defined in claim 4, wherein the light diffusing plate is disk-shaped and the lower end of the housing is threaded to engage a mating threaded portion of the microscope.

6. The illumination system defined in claim 4, wherein the the light diffusing plate comprises opal glass and the light diffusing plate includes a pair of oppositely disposed parallel substantially flat surfaces one of which receives light transmitted from the light source and another of which is positioned closely adjacent the specimen emitting the substantially spatially isotropic light.

7. An optical microscope for viewing a specimen, comprising:
   a light-transmitting stage for supporting the specimen;
   a light source for producing a light beam to illuminate the specimen staged on the microscope for observation;
   a light diffusing plate adapted to be positioned closely adjacent the specimen to receive the light beam which includes a transparent base material operatively associated with a light diffusing material adapted to randomly break up, diffuse, and scatter the light beam transmitted from said light source which passes therethrough into a multiplicity of scattered light rays comprising substantially spatially isotropic light;
   a housing having an upper end positionable closely adjacent the stage and a lower end distal therefrom, said housing having a bore extending therethrough from said upper end to said lower end, said upper end of said housing which retains the light diffusing plate transversely within said bore, said lower end of said housing being adapted to adjustably removably engage a mating portion of the microscope to allow adjustment of a distance from said light diffusing plate to a focus plane of the specimen to adjust image contrast;
   an illumination lens system adapted for focusing the light beam along a light path from said light source through said light diffuser comprising at least one lens disposed along said light path;
   a light-transmitting objective adapted to receive light transmitted through said stage illuminating the specimen which carries an image of the specimen for observation;
   an aperture diaphragm disposed along the light path and operatively associated with said lenses to allow adjustment of a numerical aperture of the light beam collimated onto said aperture diaphragm, a field diaphragm disposed along the light beam and operatively associated with said lenses which focus the light beam which passes through said aperture diaphragm through said field diaphragm to allow adjustment of the light beam to illuminate an entire field of view of the microscope at said stage, said lenses which collimate the light beam onto the light diffuser; and
   wherein the isotropic light passing through said light diffusing plate passes through the stage to illuminate the specimen with the substantially spatially isotropic light evenly and without distinction as to direction where the specimen is illuminated producing an image for observation having substantially reduced diffraction shadows visible through the microscope which obscure the specimen.

8. The microscope defined in claim 7, further comprising a camera having an imaging plane, and a microscope lens system adapted to receive the light with image transmitted through the objective and focus the image carried by the light onto said imaging plane of said camera.

9. The microscope defined in claim 8, wherein the camera comprises a video camera.

10. The microscope defined in claim 7, wherein the microscope is of an upright configuration wherein the objective is disposed above the stage, and wherein the light diffuser, the illumination lens system, and the light source are disposed below the stage.

11. The microscope defined in claim 7, wherein the microscope is of an inverted configuration wherein the objective is disposed below the stage, and wherein the light diffuser, the illumination lens system, and the light source are disposed above the stage.

12. The microscope defined in claim 7, wherein at least one of a plurality of functions chosen from the group consisting of image focus, objective selection, numerical aperture of the light beam, and illumination of the field of view is computer controlled.

13. A method of illuminating and observing a specimen disposed at a stage of an optical microscope for observation using the microscope, comprising the steps of:
   providing a near Lambertian source of substantially spatially isotropic light;
   illuminating the specimen with the substantially spatially isotropic light evenly and without distinction as to direction where the specimen is illuminated;
   focusing an image of the specimen by adjusting a vertical distance between an objective and the stage;

adjusting positioning of the near Lambertian source of light to produce a desired image contrast which is directly proportional to a distance from the near Lambertian source of light to a focus plane of the specimen;

adjusting the diameter of an aperture of an aperture diaphragm to fine tune the image contrast which is inversely proportional to a diameter of the aperture of the aperture diaphragm;

adjusting the diameter of an aperture of a field diaphragm so that an on-screen shadow of the field diaphragm is just beyond the field-of-view of the microscope; and observing the specimen illuminated with the substantially spatially isotropic light through the microscope with substantially reduced diffraction shadows visible which obscure the specimen.

14. The method defined in claim 13, wherein the a near Lambertian source of light provided comprises a light diffusing plate which includes a transparent base material operatively associated with a light diffusing material adapted to randomly break up light transmitted from a light source which passes through said base material into a multiplicity of scattered light rays comprising the substantially spatially isotropic light.

15. The method defined in claim 14, wherein the light diffusing plate provided comprises opal glass.

16. The method defined in claim 14, wherein the light diffusing plate provided includes a pair of oppositely disposed parallel substantially flat surfaces one of which receives light transmitted from the light source and another of which is positioned closely adjacent the specimen emitting the substantially spatially isotropic light.

17. The method defined in claim 14, wherein the light diffusing plate provided is disk-shaped.

18. The method defined in claim 14, wherein the near Lambertian source of light provided further comprises a housing having an upper end positionable adjacent the stage and a lower end distal therefrom, a bore which extends therethrough with the light diffusing plate transversely retained therein at the upper end, and the lower end being adapted to engage a mating portion of the microscope for adjusting positioning of the near Lambertian source of light.

19. The method defined in claim 18, wherein the lower end of the housing is threaded to engage a mating threaded portion of the microscope.

20. The method defined in claim 13, wherein the housing and the bore are both generally cylindrically shaped.

21. The method defined in claim 13, wherein the step of observing the specimen through the microscope is conducted using a camera.

22. The method defined in claim 13, wherein at least one of the steps is computer controlled.

23. The method defined in claim 13, wherein the near Lambertian source of light provided comprises a light diffusing plate which includes a transparent base material operatively associated with a light diffusing material adapted to randomly break up light transmitted from a light source which passes through said base material into a multiplicity of scattered light rays comprising the substantially spatially isotropic light, the light diffusing plate provided is disk-shaped, including a pair of oppositely disposed parallel substantially flat surfaces one of which receives light transmitted from the light source and another of which is positioned closely adjacent the specimen emitting the substantially spatially isotropic light, the near Lambertian source of light provided further comprises a housing having an upper end positionable adjacent the stage and a lower end distal therefrom, a bore which extends therethrough with the light diffusing plate transversely retained therein at the upper end, and the lower end being adapted to engage a mating portion of the microscope for adjusting positioning of the near Lambertian source of light, the lower end of the housing is threaded to engage a mating threaded portion of the microscope, and the housing and the bore are both generally cylindrically shaped.

24. The method defined in claim 23, wherein the light diffusing plate provided comprises opal glass.

* * * * *